United States Patent [19]

Stovall

[11] 3,912,994
[45] Oct. 14, 1975

[54] DIRECT CURRENT MOTOR CONTROL

[76] Inventor: Leonard A. Stovall, 2481 B 36th St., Los Alamos, N. Mex. 87544

[22] Filed: Oct. 17, 1974

[21] Appl. No.: 515,502

[52] U.S. Cl. ............... 318/341; 318/342; 318/410; 318/415
[51] Int. Cl.² .......................................... H02P 5/16
[58] Field of Search .......... 318/341, 342, 345, 410, 318/415, 416

[56] References Cited
UNITED STATES PATENTS

| | | | |
|---|---|---|---|
| 3,223,909 | 12/1965 | Sensing et al. | 318/341 X |
| 3,281,635 | 10/1966 | Hohne, Jr. | 318/341 X |
| 3,500,161 | 3/1970 | Domann et al. | 318/341 X |
| 3,579,279 | 5/1971 | Inaba et al. | 318/415 X |

Primary Examiner—G. Z. Rubinson
Attorney, Agent, or Firm—Richard A. Bachand

[57] ABSTRACT

A circuit for controlling the speed of a motor from a control voltage includes an oscillator for generating a time repeating ramp voltage. The control voltage is developed and applied to an inverter and to a comparator. The control voltage is compared in the comparator to the ramp voltage to produce a series of pulses of width proportional to the control voltage. The output from the inverter and the output from the comparator are mixed to control the magnitude of the pulses inversely proportional to the control voltage. The modified pulses are then mixed with the control voltage to impress a d-c base line level upon the pulses equal to the control voltage. The pulses are then current amplified and applied to a d-c motor. At approximately one-half of the maximum control voltage, the pulses disappear, and the control voltage alone is current amplified and applied to the motor.

5 Claims, 10 Drawing Figures

DIRECT CURRENT MOTOR CONTROL

BACKGROUND OF THE INVENTION

1. Field of the Invention

This invention relates to improvements in d-c motor controls, and more particularly to improvements in d-c motor controls of the type which apply pulses to the motor to start the motor and operate it at slow speeds.

2. Description of the Prior Art

It is often desirable to provide a capability for controlling the operating speed of a d-c motor. For example, in such aplications as camera lens controls, d-c motors are often employed to vary the lens settings and other lens parameters. In other applications, such as in model railroad locomotives, d-c motors are additionally also employed, and it is to this use that the control circuit of the invention is primarily directed. In general, the d-c motors employed in model railroad locomotives are usually inexpensive, and are most often operated under load in pulling a string of model railroad cars behind the locomotive.

It is desirable in the operation of most model railroad locomotives to provide a capability for starting and stopping the locomotive at a relatively slow rate for realistic operation. Thus, when the train is started or stopped, it desirably picks up or loses speed slowly in a fashion similar to that of the prototype after which it is modeled.

Commonly, controls for the motors are merely transformers with a rectifier connected across its output, to provide a variable d-c voltage connected to the tracks to increase or decrease the motor speed. However, because of the nature of the motors ordinarily used, the motors do not begin to turn until sufficient d-c voltage has been applied to overcome the frictional and other losses of the inexpensive motors. But at such levels, by the time the motor begins to turn, such a high d-c voltage is applied, the train starts at an unrealistically high rate of speed.

In efforts to overcome this difficulty, power supplies are available which provide a series of pulses at low motor speeds. The pulses are of sufficient voltage to cause the motor to turn, and contain sufficient low power to enable it to continue to turn at very slow speeds. Typically, the pulses are then increased in height and in some cases width as the motor control voltage is increased, to slowly increase the motor speed. At a point approximately halfway in the speed range of the motor, the pulses are switched out of the circuit, usually by a manual switch, and thereafter, a pure controllable d-c potential is applied to the motor for controlling its speed at the upper half of its range. The difficulty encountered in the pulse power supply systems as described, is that if a d-c motor is operated for prolonged periods of time on pulse power, the motor tends to overheat, and, in fact, can be destroyed.

In general, most commercially available power supplies furnish half-wave rectified pulses at low motor speeds. The sinusoidally shaped pulses are usually variable in overall height, or are formed by triggering an SCR circuit to form a partial half-wave form chopped at the trigger point of the SCRS. This, as will become apparent, is in contradistinction to the square pulse shape achieved by the circuit of the invention.

SUMMARY OF THE INVENTION

In light of the above, it is, therefore, an object of the invention to provide a circuit for producing a voltage waveform for operating a d-c motor.

It is another object of the invention to provide a circuit for generating a d-c motor driving waveform which presents a series of pulses which are continuously variable from narrow pulses of high magnitude to start and operate the motor at very slow speeds, to wider pulses at a lesser magnitude with an increasing d-c bias impressed thereon, at increasing, but slow, motor speeds, and which, at approximately one-half the original pulse magnitude presents only a variable d-c control voltage for controlling faster motor speeds.

It is still another object of the invention to present a d-c motor control circuit which can be operated by push buttons in increasing and decreasing the motor speeds, and which can maintain a pre-set motor speed without regard to external controls. The minimal current requirements allow the use of lightweight retractable cords such as coiled telephone cords to remote locations.

These and other objects, features, and advantages will become apparent to those skilled in the art from the following detailed description, when read in conjunction with the accompanying drawing and appended claims.

The invention, in its broad aspect, presents a circuit for developing a voltage for running a d-c motor from a control voltage. The circuit produces pulses at low control voltages of width proportional to the control voltage and of magnitude inversely proportional to the control voltage. At higher control voltage levels, the control voltage itself is produced. The circuit includes means for generating a voltage having a ramp waveform. Additionally, the ramp waveform, as well as the control voltage, are applied to a level comparator means, which produces a pulse output at times when the control voltage is greater than the voltage of the ramp waveform. The control voltage is additionally applied to a d-c inverter means, which produces an output inversely proportional to the control voltage. The output of the d-c inverter means and the output of the level comparator are applied to a first mixing means for establishing a voltage limit upon the pulses generated by the level comparator at the level of the voltage of the d-c inverter. The output from the first mixing means and the control voltage are then applied to a second voltage mixing means, which passes the higher voltage of the output from the first mixing means and the control voltage. The output from the second voltage mixing means is then applied to a current amplifier for amplifying the voltage waveform and applying it to the d-c motor.

BRIEF DESCRIPTION OF THE DRAWING

The invention is illustrated in the accompanying drawings, wherein.

DETAILED DESCRIPTION OF THE PREFERRED EMBODIMENTS

Figure 1:
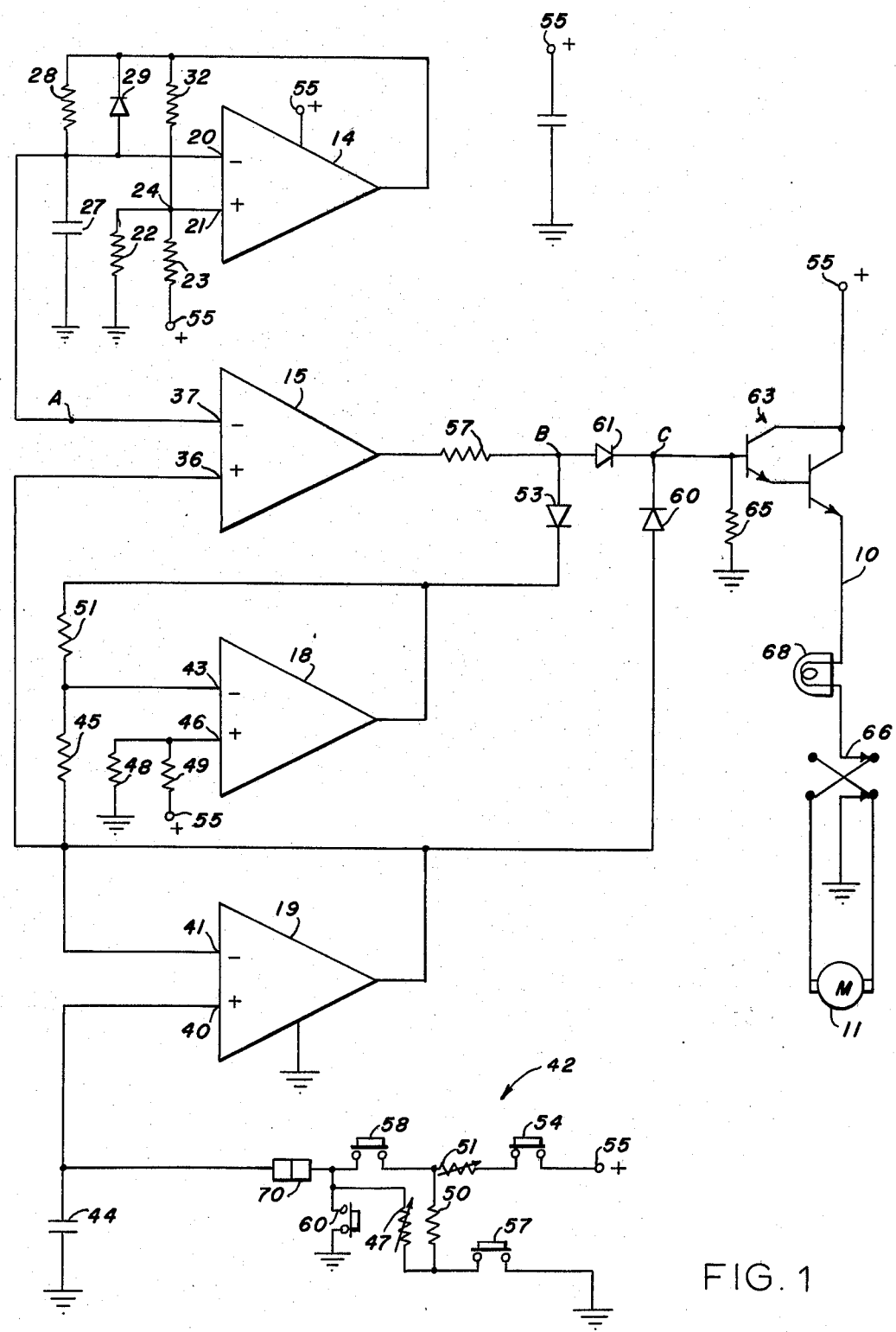
FIG. 1 is a schematic diagram of a motor control circuit, in accordance with the principles of the invention.

A schematic diagram of a motor control circuit, in accordance with the principles of the present invention, is set forth in FIG. 1. The circuit provides an output waveform upon the output line 10 for driving a d-c motor 11, which is in the form of pulses at low motor speeds of width proportional, and of height inversely proportional to a control voltage. At higher motor speeds above about one-half of the speed range, the d-c control voltage solely is provided. The d-c motor 11 can be employed in many applications, such as driving a camera lens, or other such use, but the circuit of the invention is particularly well suited for driving a d-c motor employed in such as a model railroad locomotive, or other similar use, as will become apparent from the following discussion.

The circuit utilizes four d-c, or operational, amplifiers 14, 15, 18, and 19. The operational amplifiers 14, 15, 18, and 19 employed in the circuit can be of any type well known in the art, and are not discussed in detail herein. It should be noted, however, that the amplifiers can be a part of a single integrated circuit, such as the circuit sold by National Semiconductor Corporation identified as a "LM324 quad. op. amp."

More specifically, the amplifier 14 which has an inverting input 20 and a non-inverting input 21 is connected to function as a ramp oscillator. A pair of resistors 22 and 23 are connected in series between a positive potential terminal 55 and ground, and their junction 24 is connected to the input 21 of the amplifier 14. The resistor pair 22 and 23 therefore acts as a voltage divider, to present a voltage, for instance, of one-half the supply voltage, upon the terminal 55, to the non-inverting input 21. A capacitor 27 upon which the output voltage is developed is connected between the inverting input terminal 20 of the amplifier 14 and ground. The output of the amplifier 14 is connected to the inverting input 20 by a resistor 28, and to the junction 24 between the resistors 22 and 23 by a resistor 32. A diode 29 is connected in parallel with the resistor 28.

Figure 2:
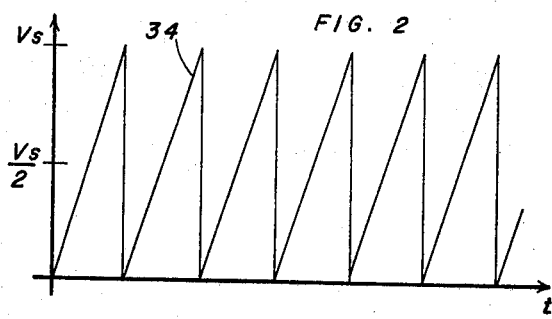
FIG. 2 is a graph of the voltage waveform at point A in the circuit of FIG. 1.
Figure 4A:
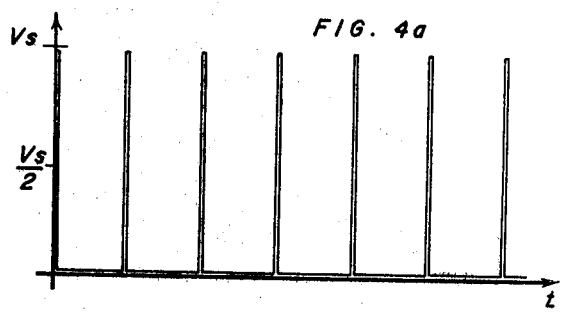
FIGS. 4 a–d are graphs of the voltage waveform at point C in the circuit of FIG. 1 at the control voltages corresponding to the control voltages producing the waveforms in FIGS. 3 a–d.

The operational amplifier 14, connected as above described, operates to produce a positive output voltage upon the capacitor 27 when the voltage upon the input 21 is larger than the voltage upon the inverting input 20. When the voltage upon the inverting input 20 is larger than the voltage upon the non-inverting input 21, the output of the amplifier 14 goes to ground potential or zero volts. Thus, in operation, the capacitor 27 is charged by the positive voltage output of the amplifier 14, as well as by the positive voltage derived at the junction 24 of the voltage divider resistors 22 and 23, via the resistor 32 and resistor 28. When the voltage built up upon the resistor 27 exceeds or equals the voltage at the junction 24 between the voltage dividing resistors 22 and 23, the output of the amplifier 14 goes to zero. The diode 29 is thereby forward biased by the voltage built up upon the capacitor 27 to discharge therethrough. The resultant voltage waveform, therefore, upon the upper plate of the capacitor 27, as applied to the inverting input 20 of the amplifier 14, and as seen at point A, is a ramp waveform, as shown in FIG. 2 by the line 34.

The ramp waveform output developed is then applied to an inverting input 37 of a level comparator 15, as below described in detail.

A control voltage is developed by the amplifier 19, which has a non-inverting input 40, and an inverting input 41. A capacitor 44 is connected between the non-inverting input 40 of the amplifier 19 and ground. The control voltage, as will become apparent, is determined by the voltage existent upon the capacitor 44; hence, the value of the capacitor should be chosen to be relatively large so that the voltage impressed upon it can be retained for as long as possible. The positive voltage for determining the control voltage is selectively applied onto and discharged from the capacitor 44 by a network 42 of controlling resistors and switches. The network 42 includes a series of three resistors 47, 50, and 51, in series with a switch 54. The switch 54 is connected to a positive terminal 55, and the resistor 47 is connected to the non-inverting input 40 of the amplifier 19. Thus, by actuating or closing the switch 54, the positive voltage from terminal 55 is conducted through the resistors 51, 50 and 47, to impress a charge onto the capacitor 44 at the rate determined by the RC time-constant established by the capacitor 44 and the resistors 47, 50, and 51. The resistors 47 and 51 can be variable resistors as shown, so that the rate at which the capacitor 44 is charged or discharged can be controlled or changed, as desired. A switch 57 is connected between the junction of resistors 47 and 50 to ground. Thus, by actuating or closing the switch 57, the charge upon the capacitor 44 is conducted through the resistor 47 to ground. Additionally, a switch 58 is provided to bypass the resistors 47 and 50, to provide a "fast action" charge and discharge capability for the capacitor 44, and a switch 60 is connected directly between the non-inverting input 40 of the amplifier 19 and ground, to immediately discharge the charge on the capacitor 44 for an "emergency stop".

As described above, the voltage applying and discharging network 42 and the capacitor 44 are connected to the non-inverting input 40 of the amplifier 19. The output of the amplifier 19 is fed back to the inverting input 41 of the amplifier 19. Thus, the amplifier 19 produces an output voltage which is directly proportional, and, which, ideally, is the same, as the voltage on the capacitor 44. The amplifier 19, therefore, acts as a voltage follower and buffer, which provides an output voltage equal to the input voltage, but with power available for driving the circuitry below described.

The output of the amplifier 19 which constitutes a d-c control voltage is additionally conducted to an inverting input 43 of the amplifier 18 via a resistor 45. The non-inverting input 46 of the amplifier 18 has a voltage applied to it as determined by voltage divider resistors 48 and 49, which are connected in series between a positive terminal 55 and ground. The output of the amplifier 18 is fed back to its inverting input 43 by a resistor 51, the ratio of the resistors 45 and 51 determining the gain of the amplifier 18. The output from amplifier 18 additionally is conducted to the cathode of a diode 53, which is one of a series of mixing diodes, the operation of which is below described.

The amplifier 18 functions to invert at its output the output of the voltage follower amplifier 19. Thus, when the output of the voltage follower amplifier 19 is zero, corresponding to a zero voltage charge on a capacitor 44, the output of the amplifier 18 is maximum. Conversely, when the output of the voltage follower amplifier 19 is maximum, corresponding to a maximum charge upon the capacitor 44, the output of the amplifier 18 is zero or a minimum value.

The control voltage at the output of the amplifier 19 is additionally conducted to a non-inverting input 36 of the amplifier 15. The amplifier 15 is a level comparator which produces an output voltage only when the voltage upon the inverting input 37 is less than the voltage applied to the non-inverting input 36. Since the voltage applied to the inverting input 37 is a ramp waveform, as above described, and as shown in FIG. 2, and the voltage upon the non-inverting input 55 is the d-c control voltage of the voltage follower amplifier 19, the output of the level comparator 15 is a series of pulses, the width of which corresponds to the portion of the sawtooth generated by the amplifier 14 of the voltage less than the control voltage of the voltage follower 19; hence, the larger the control voltage, the wider the pulses produced.

The output of the level comparator 15 is directed through a current-limiting load 57, which is connected between the output of the level comparator amplifier 15 and the anode of the diode 53. Thus, the voltage produced at point B is limited by the diode 53 to the voltage output of the inverter amplifier 18, since the diode 53 is forward biased for voltages at point B which exceed the voltage of the d-c inverter 18. For voltage levels at which the output of the d-c inverter exceeds the output voltage from the level comparator 15, on the other hand, the diode 53 will be reversed biased, and the voltage at point B will be the voltage of the output of the level comparator 15.

Figure 3A:
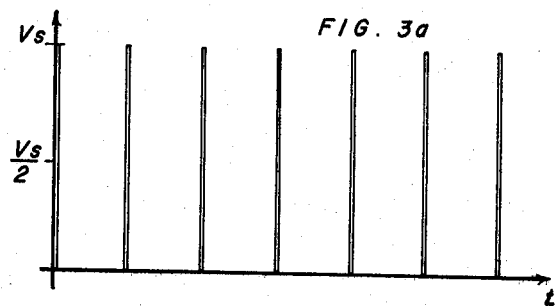
FIGS. 3 a–d are graphs of the voltage waveform at point B in the circuit of FIG. 1 at various control voltages.
Figure 3B:
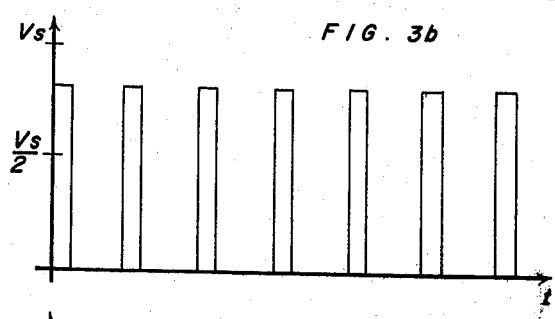
Figure 3D:
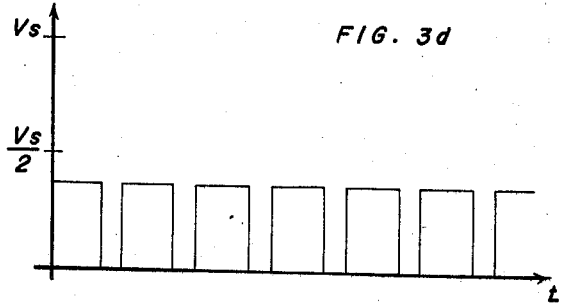

The voltage waveforms at point B for various values of the control voltage are shown in FIGS. 3a–d. (The waveforms of FIG. 3 are aligned with the voltage waveform 34 in FIG. 2 for purposes of comparison.) It can be seen in FIG. 3a that for small values of control voltage, only a small portion of the ramp voltage developed by the oscillator amplifier 14 is less than the control voltage, and a series of very narrow pulses having magnitude approximately equal to the source voltage, $V_s$, are produced. As the control voltage is increased, a greater portion of the waveform 34 is less than the control voltage, and pulses of greater width, but of lesser magnitude, due to the operation of the d-c inverter 18 through the diode 53, are produced, as shown in FIG. 3b. As the control voltage is increased still further, about one-half of the waveform 34 is greater than the control voltage, thus still wider pulses are produced, and the output of the d-c inverter 18 applied by the mixing diode 53 reduces the magnitude of the pulses still further. At the point at which the voltage of the control voltage exceeds about one-half the supply voltage, relatively broad pulses are developed, having a small amplitude, as shown in FIG. 3d.

The output of the voltage follower 19 is connected also to the anode of a mixing diode 60. The cathodes of the diodes 60 and 61 are connected together at point C, and conducted to a current amplifier 63 for application to the motor 11.

The operation of the circuit with respect to the diodes 60 and 61 is as follows. The output of the level comparator 15 as controlled in its level by the d-c inverter 18, since it is a positive voltage, is passed or conducted through the diode 61 to point C. Additionally, since the voltage output from the voltage follower 19 is a positive voltage, it is conducted through the diode 60 to point C, where it is impressed upon the voltage level or waveform produced by the level comparator 15. Thus, as the voltage of the level comparator 15 decreases due to the action of the inverter 18 through the diode 53, the base level or d-c level is increasing due to the action of the voltage follower 19 through the diode 60.

Figure 4B:
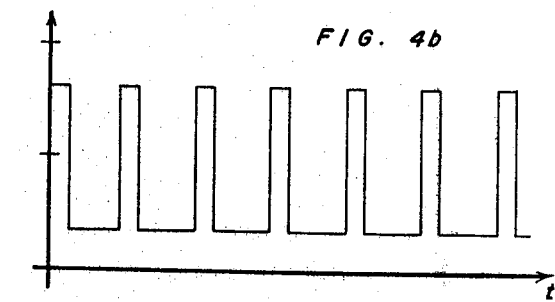
Figure 3C:
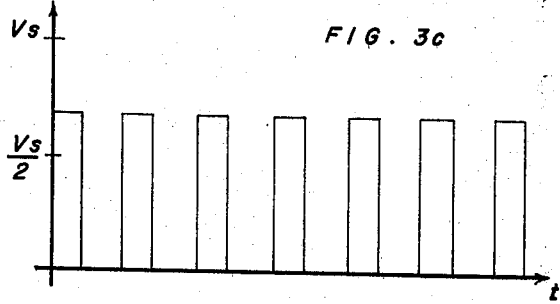
Figure 4C:
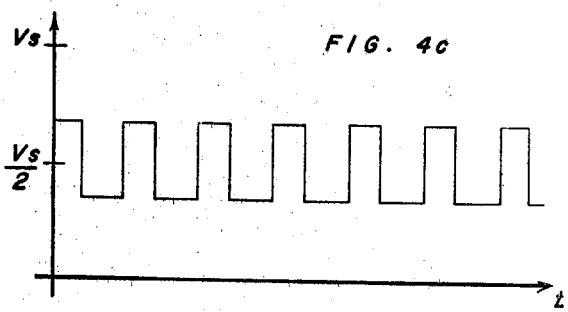
Figure 4D:
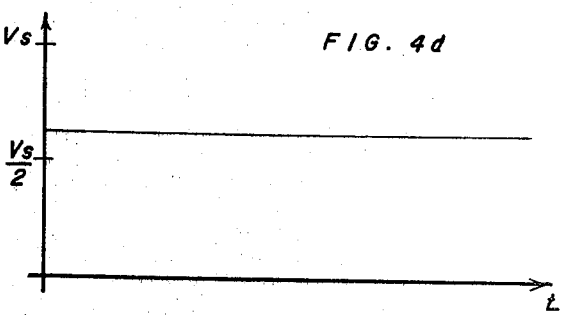

The voltage waveforms at point C are illustrated in FIGS. 4a–d. Each of the control voltage levels producing the waveforms of FIGS. 3a–d produce the corresponding waveforms in the respective FIGS. 4a–d. Thus, it can be seen in FIG. 4a, that at low control voltage levels, a small d-c level is impressed upon a waveform to raise the base line by a small amount. As the control voltage is increased, as shown in FIG. 4b, in addition to the peak voltage of the waveform being reduced, an increased base line or d-c level is impressed upon the waveform. As the control voltage is increased still further, as can be seen in FIG. 4c, the base line is increased still further. Finally, at the point at which the control voltage exceeds the voltage produced by the level comparator 15, modified by the d-c inverter 18, which is also about one-half of the control voltage, the diode 61 becomes reversed biased, and only the control voltage from the voltage follower amplifier 19 is seen at point C, as shown in FIG. 4d.

The output at point C is applied to a power amplifier 63 which can be a Darlington transistor pair, as shown, with a load resistor 65 connected between the base of the first transistor and ground.

If desired, a polarity reversing switch 66 can be employed in the output line 10, to enable the motor 11 to be run in either direction. Additionally, a load resistance, such as may be furnished by an automotive tail lamp 68 can be connected in series with the output line 10, to prevent overloading the circuit in the event of a short across the output lines.

Typical values of the components of the circuit can be as follows:

| Resistors | Value |
|---|---|
| 22, 23, 48 | 20K ohms |
| 47, 51 | 50K ohms (variable) |
| 28 | 62K ohms |
| 32 | 750 ohms |
| 57 | 5.1K ohms |
| 65 | 100K ohms |
| 51 | 7.5K ohms |
| 45 | 2.7K ohms |
| 49 | 33K ohms |
| 50 | 10K ohms |
| Capacitors | Value |
| 27 | 0.1 microfarads |
| 44 | 500 microfarads |
| Diodes | Type |
| 29, 53, 60, 61 | 1N4001 |
| Amplifiers | Type |
| 14, 15, 18 and 19 | LM324 |

As indicated above, the circuit is particularly well suited for use in operating motors of a model railroad locomotive. As discussed above, one of the principally sought goals in realistic model railroad operation is to be enabled to start and stop the motors of the model railroad locomotives or engines very slowly for prototypically appearing operation. With the circuit, in accordance with the invention, as above described, this goal can be achieved.

At very slow engine speeds, a small d-c control voltage is applied to the circuit, in the manner above described, and very narrow high voltage pulses are applied to the motor. This creates a dither in the motor, permitting it to turn. As the control voltage is increased, the voltage level of the pulses is decreased, but the pulse width is increased, applying additional power to the motor, for increasing its speed. As the control voltage is further increased, the power to the motor is further increased, with the pulses disappearing at approximately one-half throttle, to apply a pure d-c level to the motor.

It is known that continued application of pulses to a d-c motor at relatively high motor speeds can cause overheating of the motor. However, because the magnitude of the pulses decreases as the control voltage is increased, and because the pulses disappear at approximately one-half of the maximum value of the control voltage, this overheating problem is minimized. Between one-half and full control voltage, the d-c control voltage itself is applied to operate the motor. The deceleration of the motor is effected in an opposite manner, i.e., with the d-c voltage level decreasing until pulses begin to appear at approximately one-half of the maximum control voltage. As the control voltage is further decreased, the wide pulses produced become narrower and of higher magnitude.

One interesting feature of the circuit of FIG. 1 is that the value of the capacitor 44 is relatively large, and, therefore, can hold the charge impressed thereon for a considerable period of time. This is especially true because of the action of the voltage follower or buffer amplifier 19, which effectively separates the capacitor 44 from the rest of the circuitry. Thus, once the voltage is impressed upon the capacitor 44, the voltage controlling network 46 can be disconnected from the rest of the circuitry, for example, by a plug 70 in series with the line to the input of the amplifier 19. This feature can facilitate the use of a single control circuit network 46 for controlling a number of different motors at the same time. Also, since only low currents are controlled by the switches 54, 57, 58, and 60, the cord interconnecting them to the capacitor 44 can be of small physical size. This allows the use of lightweight (perhaps coiled) telephone wire for remote operation. The significance of this in the model railroad context is apparent. The push button 54 can be depressed until the train is brought up to the desired operating speed. The control assembly 42 can then be disconnected, and the train will continue to run at the same operating speed, without further attention.

Although the invention has been described and illustrated with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim:

1. A circuit for running a d-c motor from a control voltage, which produces pulses at low control voltages of width proportional to the control voltage and of magnitude inversely proportional to the control voltage, and which produces the control voltage at higher control voltage levels, comprising:

means for generating a periodic ramp voltage waveform, means for generating a d-c control voltage, means connected to said d-c control voltage generating means for selectively varying the control voltage thereof, level comparator means to which the ramp waveform and the control voltage are applied for producing a pulse output at times when the control voltage is greater than the voltage of the ramp waveform, inverter means to which the control voltage is applied for producing an output inversely proportional to the control voltage, first mixing means to which the output of said inverter means and the output of said level comparator means are applied for establishing a voltage limit upon the pulses generated by said level comparator at the level of the output voltage of said d-c inverter, second mixing means to which the output from said first mixing means and the control voltage are applied, for passing the higher voltage of said output from said first mixing means and said control voltage, and a current amplifier to which the output from said second voltage mixing means is applied for amplifying said output and applying it to the motor.

2. The circuit of claim 1 wherein said means for generating a d-c control voltage comprises:

a capacitor, an amplifier to an input of which one end of said capacitor is connected for producing a control voltage at an output of said amplifier proportional to the charge on said capacitor, and wherein said means for selectively varying the control voltage comprises:

means for selectively charging and discharging said capacitor.

3. The circuit of claim 1 wherein said means for generating a ramp voltage comprises:

an amplifier having a first input and an inverting input, said amplifier producing an output voltage when the voltage on the inverting input is less than the voltage on the first input, means for applying a reference voltage to the first input of said amplifier, a capacitor, one end of which is connected to the inverting input of said amplifier, and feedback means connecting the output of said amplifier to said end of said capacitor, whereby when the voltage on said capacitor exceeds the reference voltage, the output voltage of said amplifier ceases, discharging said capacitor, to produce a ramp voltage on said end of said capacitor.

4. The circuit of claim 1 wherein said first mixing means comprises a diode in series with the output of said d-c inverter means and connected to the output of said level comparator means, oriented to be forward biased when the output voltage of said level comparator is larger than the output voltage of said d-c inverter.

5. The circuit of claim 1 wherein said second mixing means comprises a first diode in series with the output of said level comparator oriented to be forward biased to pass the output pulses of said level comparator, and a second diode in series with the means for generating a control voltage, and connected to said first diode at an end away from said level comparator, oriented to be forward biased when the control voltage is larger than the output voltage of said level comparator.

* * * * *